(12) United States Patent
Gao et al.

(10) Patent No.: US 10,318,442 B2
(45) Date of Patent: Jun. 11, 2019

(54) PAIRING OF INPUT DEVICE AND DISPLAY IN VEHICLE INFOTAINMENT SYSTEMS

(71) Applicant: Faraday & Future Inc., Gardena, CA (US)

(72) Inventors: Liangtao Gao, San Jose, CA (US); Connie Zhao, Cerritos, CA (US); Xiaojian Li, San Jose, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days.

(21) Appl. No.: 15/600,733

(22) Filed: May 20, 2017

(65) Prior Publication Data

US 2018/0060253 A1     Mar. 1, 2018

Related U.S. Application Data

(60) Provisional application No. 62/339,756, filed on May 20, 2016, provisional application No. 62/402,967, filed on Sep. 30, 2016.

(51) Int. Cl.
| | |
|---|---|
| *G06F 13/00* | (2006.01) |
| *G06F 13/10* | (2006.01) |
| *G06F 13/42* | (2006.01) |
| *B60K 35/00* | (2006.01) |

(52) U.S. Cl.
CPC ............ *G06F 13/102* (2013.01); *B60K 35/00* (2013.01); *G06F 13/4282* (2013.01); *B60K 2350/352* (2013.01); *B60K 2350/355* (2013.01); *B60K 2350/357* (2013.01)

(58) Field of Classification Search
CPC ........................ G06F 13/102; B60K 2350/352
See application file for complete search history.

(56) References Cited

U.S. PATENT DOCUMENTS

| | | | |
|---|---|---|---|
| 2013/0030645 A1* | 1/2013 | Divine | B60K 35/00 701/36 |
| 2016/0257198 A1* | 9/2016 | Buttolo | B60K 35/00 |

\* cited by examiner

*Primary Examiner* — Zachary K Huson
(74) *Attorney, Agent, or Firm* — Veros Legal Solutions, LLP

(57) ABSTRACT

Techniques are described for pairing an input device to a display device in a vehicle infotainment system and choosing communication modes between the input device and the vehicle infotainment system. In certain embodiments, in response to detecting the presence of the input device, and based on an identity of a user associated with the input device or a detected location associated with the input device, a display device may be selected from a plurality of display devices of the vehicle infotainment system. Finally, the system may pair the input device with the selected display device and a communication mode may be selected whereby the input device can communicate with the vehicle infotainment system.

17 Claims, 8 Drawing Sheets

800

| Identifier | Communication Mode(s) | Score |
|---|---|---|
| 0001 | Bluetooth, Wi-Fi | 0.5 |
| | USB | 1 |
| 0002 | cellular | 0.1 |
| | NFC | 0.9 |

PAIRING OF INPUT DEVICE AND DISPLAY IN VEHICLE INFOTAINMENT SYSTEMS

CROSS-REFERENCE TO RELATED APPLICATIONS

This application claims the benefit of U.S. Provisional Application No. 62/339,756, filed May 20, 2016, and U.S. Provisional Application No. 62/402,967, filed Sep. 30, 2016, the entireties of which are hereby incorporated by reference.

BACKGROUND

Aspects of the disclosure relate to vehicle infotainment systems. Modern day vehicles often include vehicle infotainment systems as standard equipment. Vehicle infotainment systems can include a collection of hardware and software in automobiles that provide audio entertainment, video entertainment, vehicle navigation, and other sources of information. Modern day vehicle infotainment systems can also include various modules such as, but not limited to, automotive navigation systems, video players, USB and Bluetooth connectivity, Carputers, in-car internet, and WiFi. The vehicle infotainment systems can be controlled via steering wheel controls and/or hands free voice control. Many vehicle manufacturers market infotainment systems to customers as brand differentiators.

However, current vehicle infotainment systems fail to account for the complexity introduced by the use of multiple display devices and, in particular, fail to envision a system for organizing user input other than the use of traditional touch screens or buttons affixed to the vehicle itself. An improved system is needed for handling user input in modern vehicle infotainment systems.

SUMMARY

Certain embodiments are described for pairing an input device to a display device in a vehicle infotainment system. In certain embodiments, a process initiates with detecting, by the vehicle infotainment system, presence of the input device. In response to detecting the presence of the input device, and based on an identity of a user associated with the input device or a detected location associated with the input device, a display device may be selected from a plurality of display devices of the vehicle infotainment system. Finally, the system may pair the input device with the selected display device of the vehicle infotainment system. As result of the pairing, input events received from the input device may be directed by the vehicle infotainment system to one or more processes executing in the infotainment system corresponding to the selected display device.

In one embodiment, the selecting of the display device is based on the identity of the user associated with the input device. Here, the user associated with the input device may be recognized as a registered user of the vehicle infotainment system. A seat location of the registered user may be determined. The display device may be selected based on the determined seat location of the registered user.

In another embodiment, the selecting of the display device is based on the detected location associated with the input device. In one example, a location of a port of the vehicle infotainment system making a wired connection with the input device is determined. Here, the selection of the display device may be based on physical proximity of the display device to the determined location of the port. In another example, the location of the input device is estimated based on wireless ranging signals, and the display device is selected based on the estimated location of the input device.

In other embodiments, a vehicle infotainment system can include a transceiver unit configured to communicate with a mobile device of a plurality of mobile devices via any one of a plurality of modes, a memory configured to store a plurality of identifiers, each associated with a mobile device of the plurality of mobile devices, wherein each of the plurality of identifiers is further associated with at least one mode of the plurality of modes, and/or a processing unit communicatively coupled to the transceiver unit. The processing unit can be configured to determine whether a communication link between the mobile device and the transceiver unit is to be established. The processing unit can also be configured to, upon determining that the communication link is to be established, determine whether an identifier of the plurality of identifiers is associated with the mobile device. The processing unit can also be configured to, upon determining that an identifier of the plurality of identifiers is associated with the mobile device, select, based on a rule, a mode of the at least one mode associated with the identifier. The processing unit can further be configured to establish the communication link between the mobile device and the transceiver unit using the selected mode.

In other embodiments, a method of operating a vehicle infotainment system can include accessing a plurality of identifiers, each associated with a mobile device of a plurality of mobile devices, wherein each of the plurality of identifiers is further associated with at least one mode of a plurality of modes to communicate with a mobile device of the plurality of mobile devices; determining whether a communication link between the mobile device and the transceiver unit is to be established or is established; upon determining that the communication link is to be established or is established, determining whether an identifier of the plurality of identifiers is associated with the mobile device; upon determining that an identifier of the plurality of identifiers is associated with the mobile device, selecting a mode of the at least one mode associated with the identifier; and establishing the communication link between the mobile device and the transceiver unit using the selected mode.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 8 illustrates an example data table that can be used to store features of certain embodiments.

DETAILED DESCRIPTION

Figure 1:
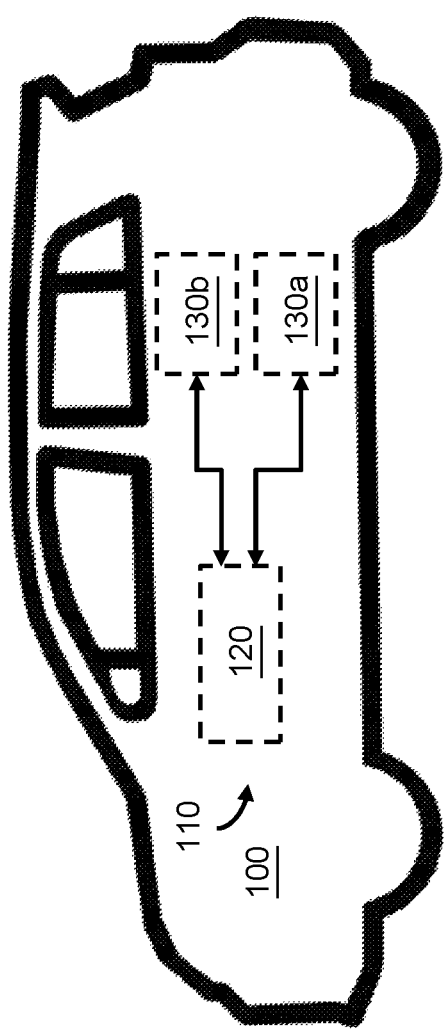
FIG. 1 illustrates an example vehicle having a simple infotainment system with multiple user accounts.

Examples are described herein in the context of vehicle infotainment systems with multiple user accounts. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Illustrative Example of Pairing an Input Device with a Display Device in a Vehicle In one illustrative example, a family gets into their car for a trip to visit grandparents over a holiday weekend. Each passenger seat is provided with a touchscreen display that is connected to an infotainment system in the car. The infotainment system can be used by the passenger to play games, watch videos, read e-books, browse the web, or engage in other activities, such as instant messaging with other passengers in the car. Each display screen may be controlled by touch input from the user. That is, a user can type text, perform a swipe, etc., directly on the display, in a convention manner. Alternatively or additionally, however, it may be desirable for a display screen to be controlled by a separate input device.

There are many potential benefits to having the ability to use a separate input device (other than the touchscreen) for entering user input. One benefit is the wider range of user input technologies that can be implemented with use of a separate device. For example, a 3-dimensional spatial controller/wand may be used for playing video games. As another example, a physical keyboard may be used, which can be more ergonomic, have a better tactile feel, and does not occupy valuable screen space, when compared with a soft/virtual keyboard presented on the display screen itself. Furthermore, as input device technology develops, newer and better types of input devices may become commercially available. A vehicle infotainment system that is capable of accommodating input devices beyond just the existing touchscreen equipped with each display will provide a more satisfying user experience.

One type of device can be particularly useful if it can be added to the vehicle infotainment system as an input device—a user's mobile device. Mobile devices, e.g., smart phones, have become ubiquitous, and seemingly every person including even children in some instances carries a mobile device as they go through their daily activities. Modern mobile devices are also packed with a plethora of sensors, along with significant computing and communications capabilities, which makes the mobile device a powerful and useful platform to serve as an input device.

Returning to the example of the family traveling in the vehicle, one of the children starts playing a video game that is available on the vehicle's infotainment system. The child can start playing the game on the display device that is viewable from her seat in the second row of the vehicle. The video game involves a virtual tennis match between the child and her idol—a profession tennis player. The child uses the touchscreen of the display device as the default input device. Specifically, the child makes "swiping" motions on the touchscreen, and the swipes are interpreted as tennis racket swings. As much as the child enjoys the video game, the inflexible, two-dimensional nature of touchscreen swipes leaves much to be desired in terms of full engagement with the action within the video game.

After a while the child decides that to really get into the video game, she needs a better "racket." So she pulls out her mobile device and opens an app that serves to manage interactions between the mobile device and the infotainment system of the vehicle. The app asks whether the child would like to use the mobile device as an input device for interfacing with the on-going tennis video game. The child responds "yes" and soon thereafter, the child begins using the mobile device as a tennis "racket" to play the video game. As the child makes a racket-swing motion in three-dimensional space, accelerometers in the mobile device capture motion data in six degrees of freedom, i.e., translational motion along each of three axes, x, y, and z, as well as rotational motion around each of the three axes x, y, and z. The motion data is wirelessly transmitted to the video game, via a Bluetooth™ connection between the mobile device and the vehicle infotainment system. Now, the tennis video game is much more fun, compared to when it was played with only finger swipes on the touchscreen. The child can take swings in three-dimensional space, with both translational and rotational motions. Each swing is more realistic, and the video game is more enjoyable to the child, thanks to the ability to use her smart phone as the input device. She even wins a set over her tennis pro idol.

There are numerous challenges that must be overcome to achieve the illustrative scenario described above, for using a separate input device in conjunction with a display within the context of a vehicle infotainment system. One particular challenge is how to "pair" an input device to a particular display device in the system. For example, how does the vehicle infotainment system know when a device, such as a smart phone belonging to a passenger, should be used as an input device in the system? Also, there are typically numerous display devices in such a system. How does the system know which display device should be paired with any given input device? A mistake can make the user experience negative and frustrating. For example, if the child playing the tennis video game started using her smart phone as an input device, but the system incorrectly paired the smart phone with the display being used to present turn-by-turn navigation directions to her parent in the driver's seat, the result can be annoying to the parent and can even create an unsafe situation. The embodiments described below address these and other considerations associated with the pairing of an input device to a display device in connection with a vehicle infotainment system.

Vehicle Infotainment System

To provide context, an example of a multi-display vehicle infotainment system is described in connection with FIGS. 1-3. FIG. 1 shows an example vehicle 100 having a simple infotainment system 110 with multiple user accounts. In this example, the vehicle 100 is a sport utility vehicle ("SUV"), though any suitable motorized vehicle may be employed. The infotainment system 110 includes a computing device 120 and two touch-sensitive display devices 130a-b. In this example, the computing device 120 is installed in a dashboard area of the vehicle 100, though in various examples, it may be installed in any suitable location, or may be divided into multiple, interconnected components, which may be installed in any suitable locations. The display devices 130a-b are installed on the rear surfaces of the two front seats of the vehicle 110, such that the display devices are visible and accessible to passengers sitting in the rear seats. While the example infotainment system 110 includes two display devices 130a-b, any number of display devices 130a-b may be incorporated into the vehicle and incorporated into an infotainment system 110 according to this disclosure.

Figure 2A:
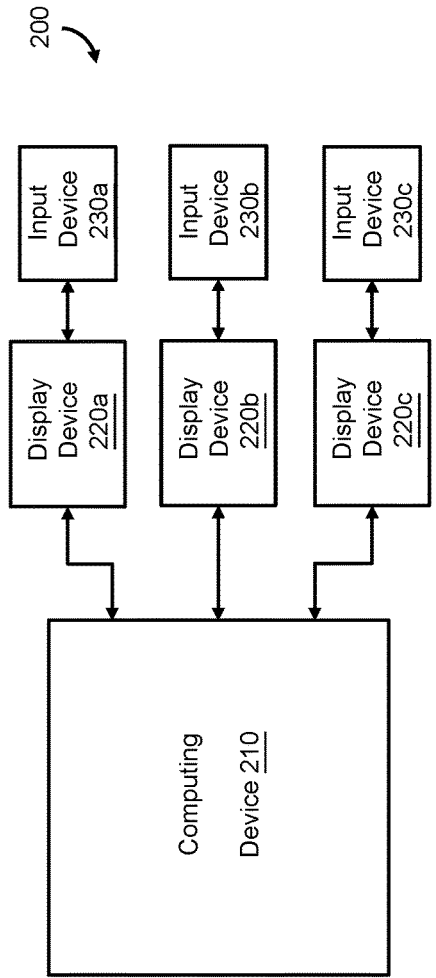
FIG. 2A illustrates an example vehicle infotainment system with multiple accounts.
Figure 2B:
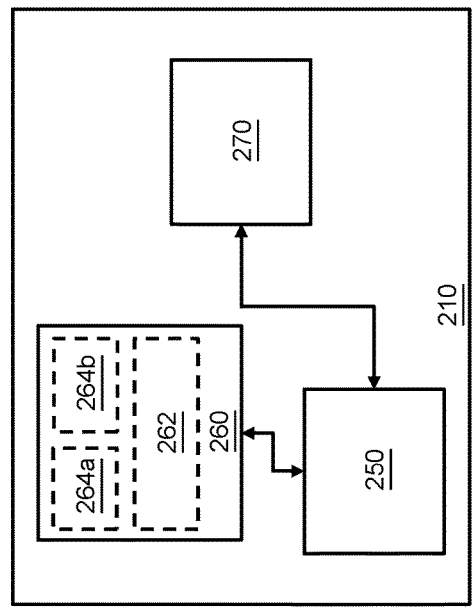
FIG. 2B illustrates a more detailed view of the computing device of FIG. 2A.

Referring now to FIGS. 2A-2B, FIG. 2A shows an example vehicle infotainment system 200 with multiple accounts. The infotainment system 200 includes a computing device 210, multiple display devices 220a-c, and multiple user input device 230a-c, each of which corresponds to one of the display devices 220a-c. FIG. 2B shows a more detailed view of the computing device 210.

Referring again to FIG. 2A, the display devices 220a-c include a display screen and are in communication with the computing device 210. In this example, the display screens 220a-c communicate with the computing device 210 via a high definition multimedia interface ("HDMI") connection; however, in some examples, other types of communications may be employed, such as video graphics array ("VGA") communications, DisplayPort™ communications, Ethernet, WiFi, universal serial bus ("USB"), Bluetooth™, near-field communications ("NFC"), or a controller area network ("CAN") bus. The display devices 220a-c are configured to receive one or more display signals from the computing device 210 and to display images on the display device's display screen based on the received display signals.

The user input devices 230a-c provide a part of the user interface for the infotainment system, and are each associated with one of the display devices 220a-c as may be seen in FIG. 2A. The user input devices 230a-c may include any suitable device for providing input to the infotainment system. Some example user input device 230a-c include touch-sensitive surfaces, microphones or microphone jacks, image sensors, buttons, D-pads, USB interfaces, Bluetooth™ interfaces, or other suitable input devices or interfaces. Further, while the example infotainment system 200 shown in FIG. 2A has one user input device 230a-c for each display device 220a-c, the infotainment system 200 may include more than one user input device 230a-c for each display device 220a-c. Or in some examples, one or more shareable user input devices 230a-c may be incorporated into the infotainment system 220.

In this example, the user input devices 230a-c provide inputs that are statically associated with their respective display devices 220a-c. For example, user input device 230a is connected to the infotainment system 200 and provides input that is only associated with display device 220a. But in some examples, user input device 220a-c may be dynamically configured to provide inputs to one or more different display screens 230a-c. For example, a vehicle may include one or more microphones, which provide audio signals to the vehicle's infotainment system, such as infotainment system 200. Inputs received from the microphone may be dynamically associated with one or more display devices.

For example, an infotainment device may employ voice recognition of received audio signals, such as voice commands, to determine a user account associated with received voice commands. Upon determining the user account, the infotainment system may then execute a command based on the received audio signals and the determined user account. In some examples, a command may be provided to a plurality of the user accounts. For example, a parent may issue a voice command to pause all video content being played on displays 230a-c. Upon recognizing the voice command as being from the parent, as opposed to a child, the infotainment system 200 may issue commands via each of the user accounts playing video content to pause the respective video content.

In some examples, the user input devices 230a-c may be incorporated into a corresponding display device 220a-c. For example, a display device 220a-c may be or include a touch-sensitive input surface. Such a touch-sensitive input surface may be overlaid on the display device's display screen to provide a touch-screen display, or it may be provided on non-display portion of the display device 220a-c, such as a housing, to provide a touchpad or similar input device.

As briefly discussed above, one or more user input devices 230a-c may be configured to receive inputs based on non-contact-based interactions. For example, one or microphones may receive voice commands or other audio inputs. An image sensor may be employed to detect gestures, recognize user faces or fingerprints, or user engagement with the infotainment system. For example, an image sensor may be used to detect whether a user is looking at his or her display screen, or whether the user's eyes have been closed for an extended period of time. Such information may be used to pause content shown on the display device, or to turn off the display device, e.g., if the user is asleep. In some examples, an image sensor may provide images of the user to the infotainment system 200, which then employs a facial recognition technique to identify the user and then to log the user into the infotainment system, in lieu of the user entering a user name and password.

Referring now to FIG. 2B, FIG. 2B shows the example computing device 210 of FIG. 2A. The computing device shown in FIG. 2B includes a processor 250 (also referred to hereinafter as a controller or infotainment controller), a computer-readable medium 260, and a communications interface 270. The computer-readable medium 260 stores program code for the processor 250 to execute. In this example, the computer-readable medium 260 includes an operating system 262 and two user applications 264a-b.

The communications interface 270 enables communications between the computing device 210 and other devices within a vehicle, such as the display devices 220a-c and the user input device 230a-c shown in FIG. 2A. As discussed above, suitable communications methods include HDMI, VGA, USB, Bluetooth™, Ethernet, WiFi, CAN, and others. In some examples, the computing device 210 may have multiple communication devices 270 to enable multiple different communications methods, e.g., to interface to different systems within the vehicle, such as navigation systems, vehicle control systems, or sensors. As will be discussed further with reference to FIGS. 6-8 in some embodiments, the communication method (also referred to hereinafter as "communication mode") can be selected Referring now to FIG. 3, FIG. 3 shows a diagram of an example operating environment 300 suitable for use with computing devices according to this disclosure, such as the computing device 210 shown in FIGS. 2A-2B. The operating environment 300 includes an operating system ("OS") 310 and underlying hardware, such as the computing device 210 shown in FIGS. 2A-2B. The OS includes multiple components such as a kernel 312, OS libraries 314, and one or more user application stacks 320a-c. Applications 330-335 execute within the operating environment 300 and on top of the OS 310. As may be seen in FIG. 3, applications execute within the context of one of the user application stacks 320a-c. For example, applications 330 and 331 execute within the context of user application stack 320a. It should be noted that applications 330-335 may be instances of the same or different applications. For example, applications 330 and 332 may each be an instance of a web browser, e.g., two different users are both browsing the web at the same time, but each is executing within the context of different user application stacks 320a and 320b.

Figure 3:
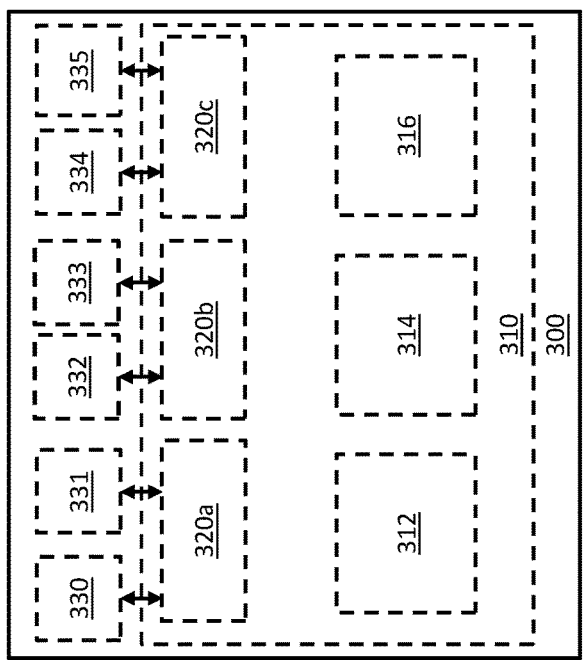
FIG. 3 illustrates a diagram of an example operating environment suitable for use with computing devices according to this disclosure, such as the computing device shown in FIGS. 2A-2B.

The OS 310 shown in FIG. 3 provides various functionalities for use within an operating environment. For example, the kernel 312 provides basic functionality of the OS, such as memory management, process or thread scheduling, and interfaces, e.g., "drivers," for various hardware components, such as user input devices, display devices, networking devices, and others. The OS 310 also provides other functionality through one or more OS libraries 314 or one or more services 316. Example OS libraries 314 include display and graphics functions, security functions, audio and video functions, data file functions (e.g., opening, reading, and writing data to and from data files), and others. Services 316 may include network services, system logging services, time services, and others. An application can employ functions within one or more OS libraries 314 or services 316 to provide various features within the application.

The user application stacks 320a-c provide execution environments for one or more applications that a user might execute. A new user application stack is created when a user logs into the OS 310 using a user account, such as by entering a login name and password. For example, a user may access a display and input device, such as display device 220a and user input device 230a shown in FIG. 2A and enter her user name and password for the infotainment system 200. The user name and password are provided to the OS 310, which upon verifying the information, creates a user application stack 320a and user interface, e.g., a GUI, for the user to interact with.

If second and third users log into the OS 310, the OS 310 creates second and third application stacks 320b, 320c and user interfaces with which the second and third users can interact. In examples according to this disclosure, the three user application stacks 320a-c are isolated from each other by the OS 310, meaning that in the ordinary course, the OS does not permit the applications or other processes executing on one user application stack 320a to interact with applications or processes executing on another user application stack 320b. For example, the OS 310 prevents one user application stack 320a from accessing memory allocated to another application stack 320b-c.

In this application, the OS 310 is a mobile device OS, such as Android or iOS, and thus does not natively allow multiple concurrent user accounts or multiple user accounts operating in the foreground, and may not natively allow multiple user accounts at all. Thus, the OS 310 has been modified to allow multiple user accounts and to allow multiple of those accounts to both be concurrently logged into the same operating environment 300 and to be concurrently executing in the foreground, thereby allowing multiple users to interact with the operating environment 300 concurrently.

In this example, when a user logs into a user account, the OS 310 creates a new user application stack associated with the user and connects the user application stack to the display device and user input device from which the user logged into the user account. The OS 310 also provides identification ("ID") values to the display device and user input device associated with the new user stack, thereby allowing the OS 310 to differentiate between inputs from different user input devices and events or information to be output to different display devices. Thus, if a user is sitting in the right rear passenger seat of the vehicle 100 shown in FIG. 1 and logs the infotainment system 110 using the touchscreen 120a, the OS 310 will create a new application stack and user interface, provide one or more ID values for the touchscreen 120a or other user input device(s), and provide the user interface to the touchscreen 120a.

As the user interacts with the touchscreen 120a, e.g., by touching a location on the screen corresponding to a GUI element, messages may be generated having information such as the location of the touch, a detected pressure or pressure-like parameter, and an ID value associated with the touchscreen. The OS 310 may determine a user application stack corresponding to the ID value and pass the message to the user application stack for processing. Similarly, display messages generated by an application executing on a user application stack may include an ID value associated with the user application stack and be routed to the appropriate display device.

The infotainment system 110 will not also provide the user interface of touchscreen 120a to the other touchscreen 120b, but will instead allow a different user to log into the infotainment system 110 via the other touchscreen 120b. In some examples, however, multiple users may log into the infotainment system via the same display device, and may each be provided with their own window on the display device within which they may interact with the infotainment system via their own user account.

In addition to creating the application stack, the OS 310 also accesses profile information about the user that has logged into the infotainment system. Profile information may include information about the user, user settings, and user preference information. Information about the user may include the user's name, the user's picture or other avatar, fingerprint or other biometric information about the user, or other information. User settings may include information such as user-installed applications or widgets, e.g., Facebook and Spotify; background images, screen resolution, user input device sensitivity, and input gesture settings. For example, a first user may download and install a set of applications, while a second user may download and install a different set of applications. When the first user logs in, she may be presented with the option to launch any of the applications she previously downloaded and installed, but not those downloaded and installed by the second user. It should be noted that while different users may each install copies of the same application, different instances of the same application will be associated with the respective user accounts that have downloaded and installed the application. Thus, if two users download and install the Facebook application, each will be presented with a copy of the Facebook application, but upon accessing the application, each will be provided with their respective Facebook account.

Manual Pairing

For ease of explanation, pairing of an input device to a display device can be roughly categorized into two basic approaches—manual pairing and automatic pairing. Such categorization should not be interpreted as a strict rule. In fact, some forms of manual pairing may involve certain steps that occur automatically, such as an automatic initiation of a pairing process that is mainly manual in nature. By the same token, some forms of automatic pairing may involve certain aspects that are manual, such as a pairing process that is automatically performed for the most part, but involves a final authorization step that requires a user to manually provide approval. Thus, the distinction discussed herein between manual pairing and automatic pairing should be interpreted as being associated with approximate categories.

Figure 4:
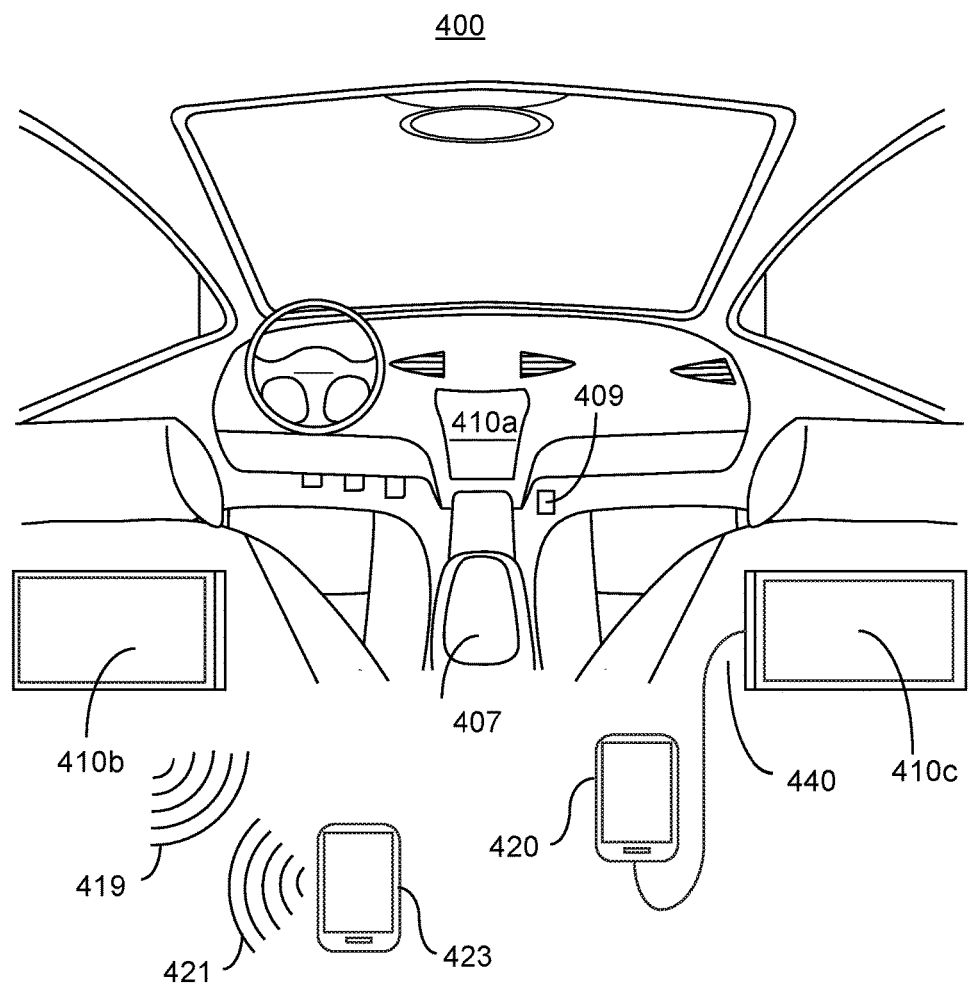
FIG. 4 illustrates the interior of a vehicle which includes a vehicle infotainment system similar to that described previously in FIG. 2A.

According to certain embodiments of the disclosure, an input device may be manually paired with a display device within a vehicle infotainment system. Referring to FIG. 4, the figure shows the interior of a vehicle 400 which includes a vehicle infotainment system similar that described previously in FIG. 2A. Here, the vehicle infotainment system comprises processing and storage resources (not shown), as well as multiple display devices, including display device 410a for one or both passengers seated in the front row of the vehicle and display devices 410b and 410c for passengers seated in the two seats in the rear row of vehicle.

In the rear row, a passenger seated in the right rear seat may connect a smart phone 420, via a USB cable, to a USB port 440 located on the housing of the display device 410c, which is being used by this particular passenger. By doing so, the passenger may initiate a sequence of events that pairs the smart phone 420 to the display device 410c. According to the present embodiment, the sequence of events involves manual pairing. For example, upon sensing that a device has been connected to a USB port, e.g., USB port 440, in the system, the vehicle infotainment system may send a broadcast notification message to all users in the vehicle to announce that a new input device has been detected. The broadcast notification message may appear on all the display devices within the vehicle, including display devices 410a, 410b, and 410c. The message may instruct the users that anyone who is interested in utilizing the newly detected device as their input device is to proceed with performing certain steps to "pair" the detected device to the user's display device. The steps for completing such pairing may be manual in nature. For example, the message may instruct that the interested user should manually achieve the pairing by opening a Settings or Configuration page on the user's display device. Once the Settings/Configuration page is opened, an option may be available for choosing smart phone 420 from a listing of detected input devices. The user may choose smart phone 420 from the list and select a "pair" button to pair the smart phone with the display device being used by the user, e.g., display device 410c.

In this particular example, no assumption is made regarding which user will choose to pair his/her display device with smart phone 420. The broadcast notification message that announces the detection of smart phone 420 is sent to all the users within the vehicle, and the system relies on each user to decide whether he/she is interested in pairing smart phone 420 to his/her display device. By completing a manual process such as that describe above, a user may pair an input device with a particular display device.

There are many types of input devices that may be paired to a display device of the vehicle infotainment system. One example is a mobile device, such as smart phone 420 described above. Other types of input devices include, but are not limited to, a mouse, keyboard, stylus, game pad, track ball, touch pad, joystick, etc. Often times, input devices support wireless connectivity, such as via a Bluetooth™ connection. Many input devices may implement a wireless connection through the use of a dongle. For example, a wireless keyboard may have an associated dongle. The wireless input device and its dongle each includes a wireless transceiver, which enable the wireless connection to be established between the wireless input device and the dongle. The dongle can be plugged into a port, e.g., a USB port, of the device or system to which the input device is to be connected. Other examples of wireless input devices may utilize a device ID, instead of a dongle, to manage the wireless connection. One such wireless input device is a wireless mobile headphone. The wireless mobile headphone may be associated with a particular device ID. A device or system may detect the wireless mobile headphone and present its device ID to the user, who may be asked to authorize connection with the headphone. Even though a dongle, device ID, or other means may be provided to establish a physical wireless connection to the input device, the process of pairing the input device to a particular display device in a vehicle infotainment system may still prove to be challenging. The approaches presently described for manual or automatic pairing may be adopted to realize such a pairing.

Once the pairing is completed, the OS of the vehicle infotainment system recognizes the paired relationship between the input device and the display device. When the user performs an input (e.g., a keystroke, swipe, swing, etc.), the input device generates an input event and sends the input event to the OS. The OS, having knowledge of pairing relationship, directs the input event to the processes executing in the portion of the OS associated with the paired display device. For example, referring to FIG. 3, such a portion of the OS might comprise user application stack 320a. In this manner, a user's inputs may be directed to the appropriate processes associated with the display device being utilized by the user.

Automatic Pairing

According to certain embodiments of the disclosure, an input device may be automatically paired with a display device within a vehicle infotainment system. Here, pairing of the input device and the display device may involve little or no action on the part of the user. Instead, the vehicle infotainment system is capable of performing pairing, e.g., decide when to pair and which display device to pair with a particular input device, largely based on contextual cues.

a) Based on System Configuration

One simple example of automatic pairing is based on system configuration information. Here, the vehicle infotainment system may be arranged to be quite flexible in how it manages input and output devices. Such flexibility may be reflected in the absence of assumptions being made about how each input device and output device is associated with one another. The lack of assumption regarding device relationships may even extend to a physically integrated input/output device such as a touch screen. At least at the outset, the OS of the vehicle infotainment system may view the touch sensor panel portion (input device) of the touchscreen as a separate, unrelated device from the display panel portion (output device) of the touchscreen. Thus, no pairing between the touch sensor panel and the display panel exists, at least initially, even though the two panels are integrated into one physical touchscreen device. From such a baseline, the vehicle infotainment system may be configured to establish factory-set pairing relationships. For example, the touch sensor panel and the display panel of the same touchscreen may be configured based on factory settings as two devices that have a logical relationship with one another. According to an embodiment of the disclosure, the vehicle infotainment system is capable of accessing such configuration information. Based on the configuration information, the system may infer that the touch sensor panel should be automatically paired with the display panel.

b) Based on User Identity

According to certain embodiments, the selection of a display device with which to pair an input device may be based on the identity of the user associated with the input device. In the example mentioned previously of the child sitting in the second row of a vehicle playing a tennis video game, the vehicle infotainment system may decide to pair the child's smart phone to the display in front of the child (as opposed to a display in front of her mother in the front row), based on the identity of the child. Here, the input device in question is a smart phone, which is generally closely tied to the identity of its user. Thus, the vehicle infotainment system may communicate with the smart phone and be able to obtain the identity of the child. Having received the identity of the user (i.e., the child) associated with the input device, the vehicle infotainment system may check to see if the user is a registered user of the vehicle infotainment system. For instance, upon entering the vehicle at the start of the road trip, the child may have performed a login to the vehicle infotainment system using the touchscreen on the display in front of her.

Furthermore, the vehicle infotainment system may also be aware which seat each registered user is currently sitting within the vehicle. Determination of a registered user's seat location may be performed in various ways. For example, the seat location of a user may be determined based on the last location where the user performed a login operation. Thus, if the child last logged in to the vehicle infotainment system using the touchscreen in front of the right, rear seat of the vehicle, the vehicle infotainment system may determine that the child's current seat location is the right, rear seat. Alternatively or additionally, the seat location of a user may be determined based on biometric information captured within the cabin of the vehicle. For instance, the vehicle infotainment system may maintain a profile of each registered user that includes biometric information such as fingerprint information, facial geometry information, iris pattern information, etc. that can be used to identify the user. Based on readings from sensors such as fingerprint sensors, sonar sensors, cameras, etc. positioned in the cabin of the vehicle, and the known profile information, the system may be able to detect the presence as well as estimate the seat location of each user.

Having determined both (1) the identity of the user of a detected input device and (2) the seat position of the identified user, the vehicle infotainment system may be able to determine that the display device associated with the seat position of the identified user is the correct display device with which to pair the input device.

c) Based on Input Device Location

According to certain embodiments, the selection of a display device with which to pair an input device may be based on the detected location of the input device. In the example of the child sitting in the second row of a vehicle playing a tennis video game, the vehicle infotainment system may decide to pair the child's smart phone to the display in front of the child (as opposed to a display in front of her mother in the front row), based on the detected physical location of the child's smart phone. In one embodiment, the vehicle infotainment system detects the location of the input device by determining a location of a port with which the input device has made a wired connection. For example, referring to FIG. 4, the child may have plugged her smart phone 420 to a USB port 440 of the vehicle infotainment system via a USB connection 430. The vehicle infotainment system may infer—based on the fact that smart phone 420 is plugged into USB port 440, and USB port 440 is in close physical proximity to display device 410c—that display device 410c is the correct display with which smart phone 420 should be paired.

In another embodiment, the vehicle infotainment system detects the location of the input device by estimating the location of the input device based on wireless ranging signals. Various technologies are available for estimating the location of a device based on wireless ranging signals. For example, a Bluetooth™ wireless connection may support wireless ranging in the form of an estimated direction and estimated distance to a target device. Here, if the user input device is connected wirelessly via a Bluetooth™ connection to the vehicle infotainment system, the system may detect the location of the input device based on such estimated direction and distance information.

Once the vehicle infotainment system obtains a detected location of the input device, via an approach such as that described above, the system may select the display device with which to pair the input device accordingly. That is, the vehicle infotainment system may select which display device should be paired with the input device based on the detected location of the input device. In at least one embodiment, the display device that is in closest proximity to the detected location of the input device is selected.

Mobile Device and App

According to certain embodiments, a mobile device (e.g., a smart phone) serving as an input device may implement various pairing operations through the use of an app, e.g., an application executing on the mobile device. The app may run in the background of the smart phone to communicate with the vehicle infotainment system and facilitate the pairing process. For example, upon entering a vehicle, a user's smart phone, via the app, may establish a communication link with the vehicle infotainment system. The communication mode may be selected, for example, using the system discussed with reference to FIGS. 6-8 below.

This communication may allow the vehicle infotainment system to detect the presence of the smart phone and thereby initiate the pairing process. The app is aware of the identity of the user of the smart phone and can communicate the user's identity to the vehicle infotainment system. Furthermore, the app may support operations related to the determination of the location of the input device itself as well as the determination of the location of the user. Thus, the app may facilitate various aspects of the pairing process.

Once pairing has been successfully achieved, the app may present a GUI that contains soft buttons, dials, sliders, indicators, and other features to support the operation of the smart phone as an input device. In addition to visual features, the app may also present non-visual features such as vibrations, counter forces, and other tactile feedback to further support the operation of the smart phone as an input device. Finally, the app may communicate input events (e.g., keystrokes, swipes, three-dimensional motion, etc.) to the vehicle communication system.

Illustrative Process Flow for Pairing an Input Device With a Display Device

Figure 5:
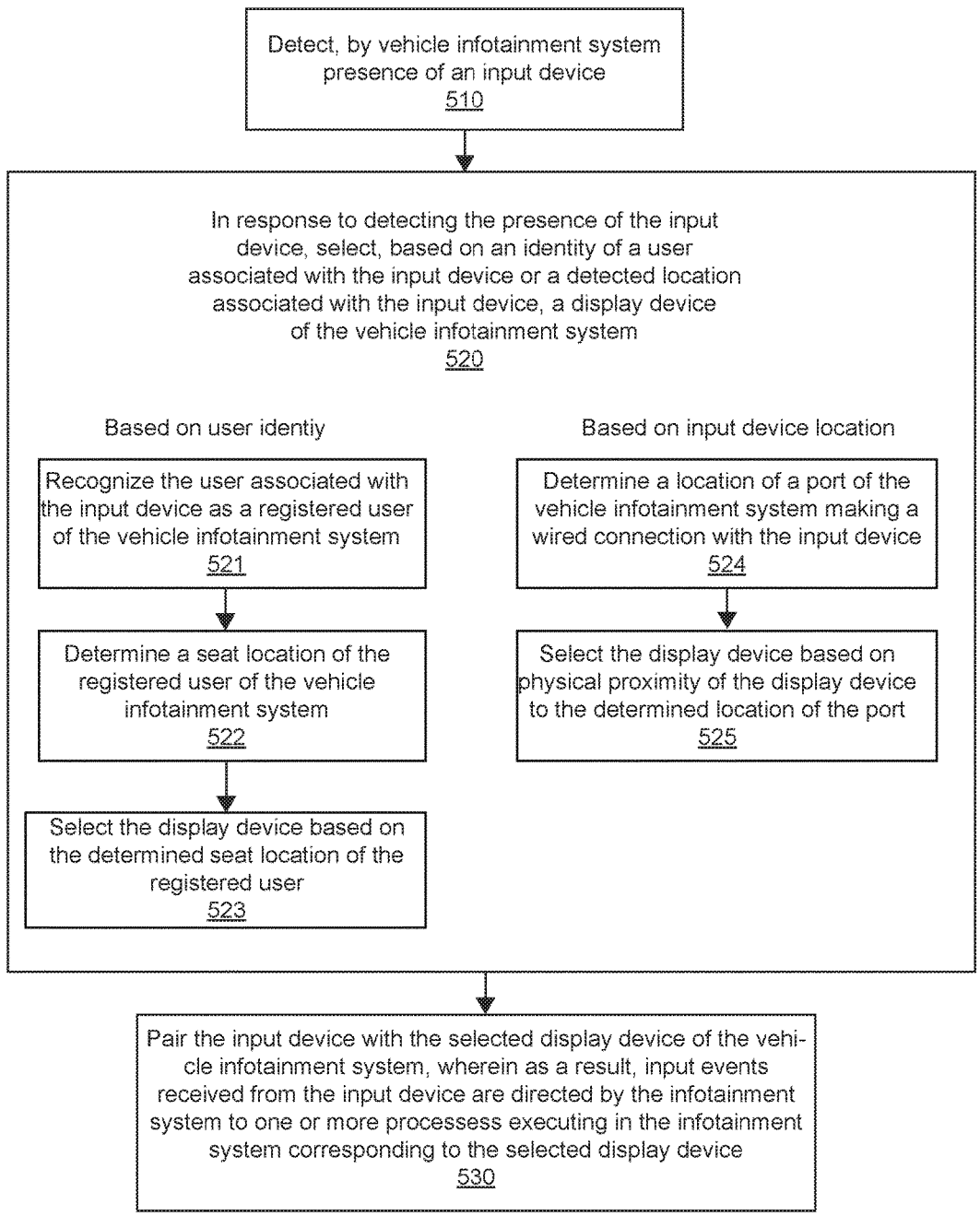
FIG. 5 illustrates a flowchart showing an illustrative process for pairing an input device with a display device in a vehicle infotainment system, according to certain embodiments.

FIG. 5 is a flowchart showing an illustrative process 500 for pairing an input device with a display device in a vehicle infotainment system, according to at least one embodiment of the disclosure. At a step 510, the process involves detecting, by the vehicle infotainment system, a presence of an input device. At a step 520, the process involves, in response to detecting the presence of the input device, selecting, based on an identity of a user associated with the input device or a detected location associated with the input device, a display device from a plurality of display devices of the vehicle infotainment system.

If the selection is based on user identity, the selection may comprise steps 521, 522, and 523. At step 521, the process involves recognizing the user associated with the input device as a registered user of the vehicle infotainment system. At step 522, the process involves determining a seat location of the registered user of the vehicle infotainment system. At step 523, the process involves selecting the display device based on the determined seat location of the registered user.

If the selection is based on input device location, the selection may comprise steps 524 and 525. At step 524, the process involves determining a location of a port of the vehicle infotainment system making a wired connection with the input device. At step 525, the process involves selecting the display device based on physical proximity of the display device to the determined location of the port.

After the display device is selected, at step 530, the process involves pairing the input device with the selected display device of the vehicle infotainment system. As result of the pairing, input events received from the input device may be directed by the vehicle infotainment system to one or more processes executing in the infotainment system corresponding to the selected display device. The communication mode by which data is sent between the infotainment system (e.g., a transceiver in the infotainment system), the input device, and the selected display device may be selected as discussed below with respect to FIGS. 6-8.

It should be appreciated that the specific steps illustrated in FIG. 5 provide a particular process 500 of pairing an input device with a display. Other sequences of steps may also be performed according to alternative embodiments. For example, alternative embodiments may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. It should be understood that any of the concepts discussed thus far throughout this disclosure (e.g., FIGS. 1-4) can be applied to process 500 or variants thereof. One of ordinary skill in the art would recognize and appreciate many variations, modifications, and alternatives of process 500.

Techniques for Selecting Vehicle Infotainment Communication Modes

Referring back to FIG. 4, infotainment system 200 can further include one or more access points. Access point 407 can be an inductive charging pad, for example, that may allow a user to charge mobile device 423 by placing mobile device 423 on access point 407. Access point 407 may also contain or be co-located with various transceivers to enable communication modes with mobile device 423 when it is placed on access point 407. For example, an NFC transceiver can be collocated with access point 407. Access point 409 can be, for example, a USB access port that may allow an occupant to charge mobile device 423, for example. Access point 409 may also allow a user with a communication medium through a tethered connection to the infotainment system.

Although a wireless communication transceiver is not illustrated, mobile device 423 is illustrated as communicating with the infotainment system via wireless transmissions 419 and 421. Wireless transmissions 419 and 421 can represent various communication protocols, signal strengths, or other communication modes that may be used for communication between the infotainment system and mobile device 423. The communications, as illustrated, can be bidirectional between mobile device 423 and the infotainment system. Furthermore, wireless communication can be enabled when mobile device 423 is located within the vehicle, outside, but in proximity with the vehicle, or remote from the vehicle using various communication modes. For example, Bluetooth® communications can be utilized when a device is within an interior of a vehicle, Wi-Fi® can be utilized when the device is outside of the vehicle, but still in proximity with it, and cellular communications can be used if mobile device 423 is remote from the vehicle.

Referring back to FIG. 2, infotainment controller 250 can be a central control unit for infotainment system 200, or control of infotainment system 200 can be distributed. In some embodiments, infotainment controller 250 is mounted within a dash of a vehicle and can provide various infotainment functions. For example, infotainment controller 250 can contain various interfaces modules for Frequency Modulation (FM) radio, Amplitude Modulation (AM) radio, satellite radio, cellular communication, or other. Infotainment controller 250 can include various processors such as x86 compatible, ARM® compatible, or other. Infotainment controller 250 can implement various Operating Systems, such as Linux®, Windows®, Android®, etc. Infotainment controller 250 can also be coupled to one or more displays, interfaces modules, controls, etc. In some embodiments, infotainment controller 250 can be distributed. For example, infotainment controller 250 can contain various processors, displays, interfaces modules, or other devices that can be distributed throughout a vehicle. For example, an automobile may have dedicated infotainment components for each station, wherein each station can be associated with a seat (e.g., screen(s), speaker(s), control(s), etc.). Infotainment controller 250 functionality can likewise be distributed across these various stations. Functionality of infotainment system 200 can be distributed across these modules or isolated to certain modules, stations, or other. In certain embodiments, stations can be associated with more than one seat/user. In certain embodiments, stations can be distributed through a bus, plane, train, boat, or other vehicle.

Figure 6:
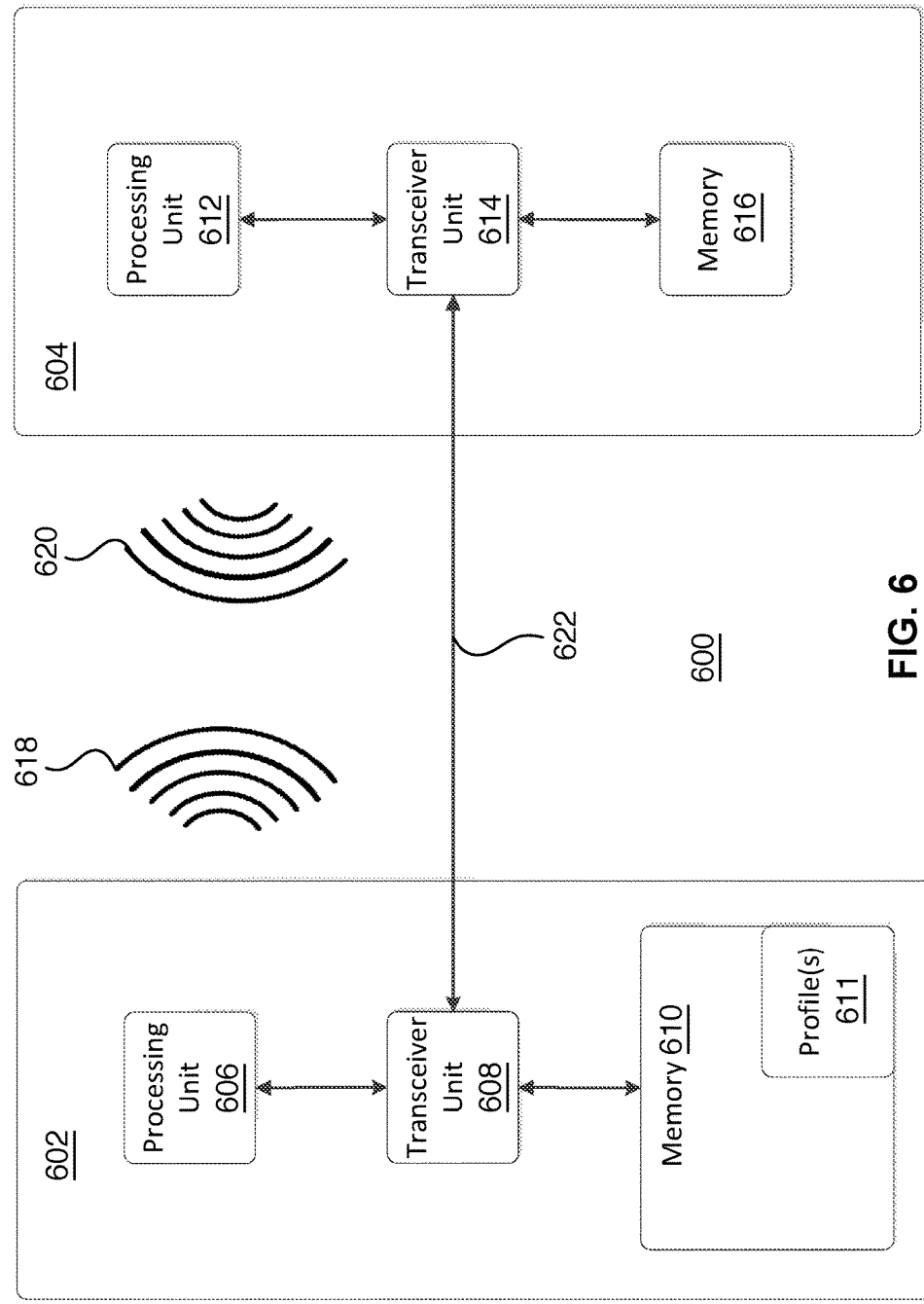
FIG. 6 illustrates an infotainment system and mobile device which with dynamic communication mode selection, including features of certain embodiments.

In some embodiments, the communication mode between input device (e.g., a mobile device) and infotainment system 200 can be dynamically selected. FIG. 6 shows an example logical system diagram 600 including an infotainment controller 602 and a mobile device 604. Infotainment controller 602 can be infotainment controller 250. Mobile device 604 can be mobile device 423. FIG. 6 illustrates two mediums through which infotainment controller 602 and mobile device 604 can communicate. Two wireless transmissions, 618 and 620 respectively, are illustrated as a communication mode through a first medium. Wireless transmissions 618 and 620 can include Wi-Fi®, Bluetooth®, NFC®, cellular, Z-Wave®, Zigbee®, Long-Term Evolution (LTE), 4G, 3G, Code Division Multiple Access (CDMA), Global System for Mobile Communications (GSM), 802.11, 802.16, or other. Physical transmission path 622 is illustrated as a second medium through which communications can be transferred. Physical transmission path 622 can implement various protocols, such as USB®, Firewire®, external Serial Advanced Technology Attachment (eSATA), Ethernet, I²C, CAN, Serial Peripheral Interface (SPI), or other.

Physical transmission path 622 interface jacks can be located throughout a vehicle, such as on a central console, behind a seat, on a console between rear seats of an automobile, on the back of a plane seat, on a plane arm rest, on a door, within a glove box, etc. Physical transmission path 622 interfaces can be implemented via various physical connectors such as, USB® type-A, USB® type-B, USB® type-C, mini USB®, micro USB®, Thunderbolt®, Lightning®, or other.

Infotainment controller 602 can include processing unit 606 that can include one or more serial processors (e.g., x86 or ARM®), parallel processors, or a combination. The processors can include Field Programmable Gate Arrays (FPGAs), Application Specific Integrated Circuits (ASICs), logic gates, or the like. Processing unit 606 can be implemented via one or more integrated circuit dies, or can be combined on a die with other circuits of Infotainment controller 602. Processing unit 606, can be used implement various functionality of Infotainment controller 602. In some embodiments, processing unit 606 can implement one or more operating systems or other software packages. For example, a user can interact with infotainment controller 602 via a display and controls. An operating system interface can be rendered on the display to enable various functionality of the infotainment controller 602. Processing unit 612 of mobile device 604 can have similar functionality and/or components as processing unit 606 of infotainment controller 602.

Transceiver unit 608 can include one or more transceivers to implement the various communication protocols described herein for communication between infotainment controller 602 and mobile device 604. In some embodiments, infotainment controller 602 is configured to communicate with a set number of mobile devices (such as mobile device 604) via a specific protocol or medium. For example, infotainment controller 602 may only be able to communicate with four mobile devices concurrently via Bluetooth®. Otherwise, an infotainment system may only have a certain number of physical transmission paths 622 available to communicate with mobile devices. For example, transceiver unit 608 may only be capable of communication with 1, 2, 3, or 4 mobile devices via a specific protocol. This may be due to hardware limitations of a specific transceiver, group of transceivers, protocol limitations, software limitations, or other. As such, allocation of protocol channels and/or physical transmission paths may be needed.

Transceiver unit 614 of mobile device 604 can be similar in function to transceiver unit 608 of infotainment controller 602. However, protocols supported by transceiver unit 614 may be different than protocols supported by transceiver unit 608. Protocols of transceiver unit 614 may be a subset of protocols supported by transceiver unit 608 or vice-versa. For example, mobile device 604 may have a shorter development cycle / shorter life cycle than infotainment controller 602. Mobile device 604 may thus integrate one or more newer protocols that were not implemented within infotainment controller 602. Furthermore, infotainment controller 602 may implement higher power protocols that are not available/feasible for mobile device 604.

Infotainment controller 602 can include memory 610 and mobile device 604 can include memory 616. Either of memory 610 or memory 616 can include primary memory or secondary memory. The memories can be implemented with various integrated circuit die arrangements. For example, either memory 610 or memory 616 can be implemented with a plurality of memory integrated circuit dies that can be partitioned in a variety of ways. Memory 610 or memory 616 can include static memory, dynamic memory, solid state memory, memory in mechanical drives, Double Data Rate (DDR) memory, Static Random Access Memory (SRAM), or other memory types. Processing units 606 and 612 and Transceiver units 608 and 614 can include memory.

Memory 610 of infotainment controller 602 can include profile(s) 611. Profile(s) 611 can be used to store information pertaining to preferences for selection of various communication modes with a mobile device. For example, mobile device 604 can be identified as specific mobile device associated with a profile of profile(s) 611 or a type of device associated with the profile. Profile(s) 611 can also include various identifiers that can be associated with mobile devices or mobile device types. These identifiers can be associated with various communication mode preferences, as will become apparent from the disclosure.

Illustrative Process Flow for Selecting Communication Mode

Figure 7:
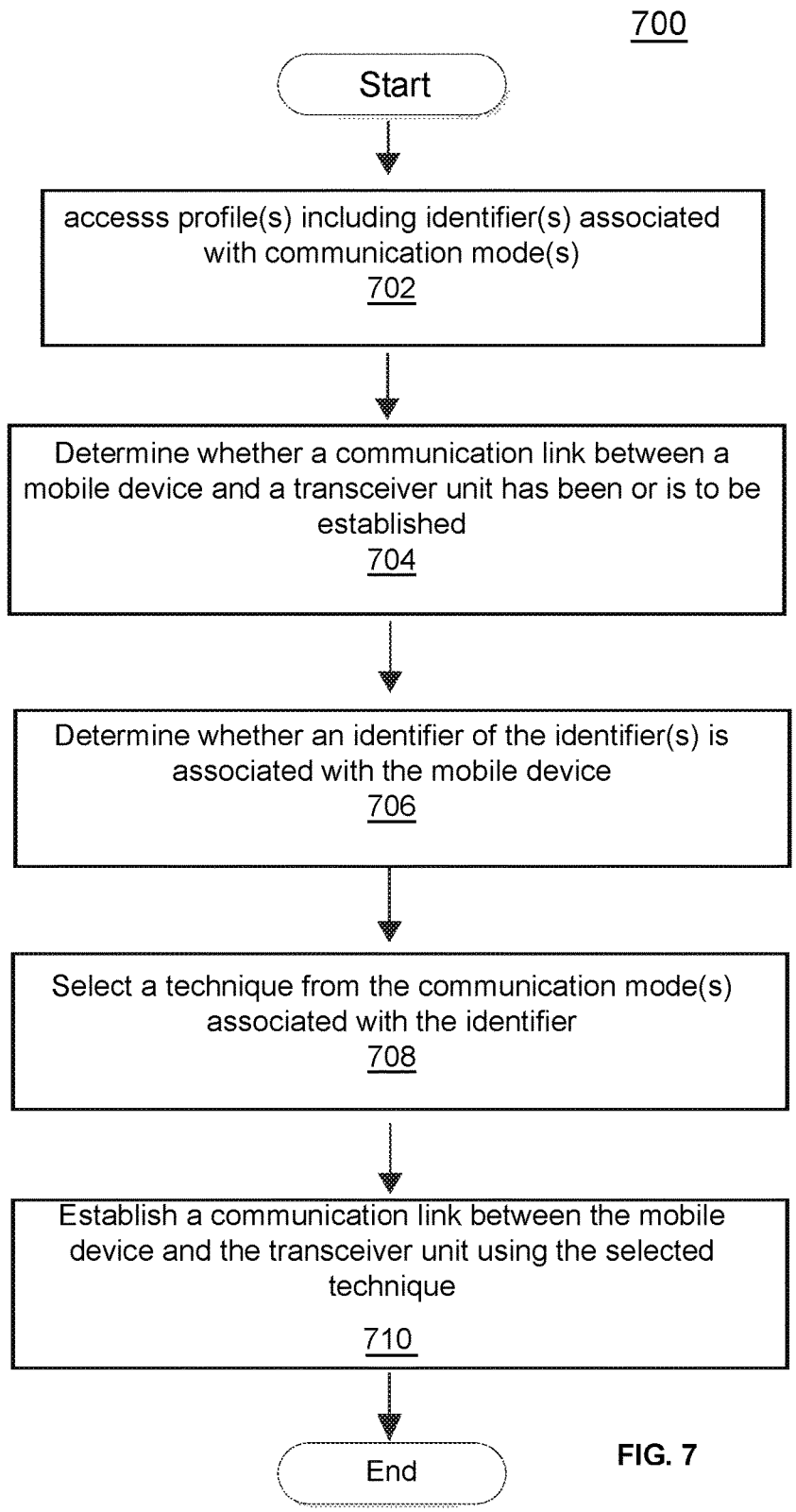
FIG. 7 illustrates an example flowchart showing an illustrative process for selecting a communication mode, including features of certain embodiments.

FIG. 7 shows an example flowchart 700 for implementing features of certain embodiments. At 702, profile(s) can be accessed from, for example, memory of an infotainment system. The profile(s) can be profile(s) 611. Each of the profiles(s) can include one or more identifiers. Each of the one or more identifiers can be associated with one or more communication mode. The communication modes can be modes that an infotainment system is capable of implementing for communication with mobile devices. The communication modes associated with the identifier can be communication modes that the infotainment system is capable of utilizing to communicate with the specific mobile device, the model of mobile device, or communication modes that have been determined to be desirable for communication with the mobile device or type of device.

At 704, a determination can be made as to whether a communication link between a mobile device and a transceiver unit of an infotainment system has been or is to be established. In some embodiments, sensors of a vehicle, information obtained from external computer systems (such as via crowd sourcing or via an internet message), detection of a key fob or other device, or other information can be used to determine if a communication link is to be established. A communication link can also be established upon powering on a vehicle.

At 706, a determination can be made as to whether an identifier of the identifier(s) is associated with the mobile device. Identifying information can be obtained from the mobile device in the form of a Media Access Control (MAC) address or other. This information can be obtained directly from the mobile device via communication with the mobile device. In some embodiments, the identifying information can be obtained via association with a specific user or user name. For example, a user may log into an infotainment system using credentials. The credentials can be associated with a specific mobile device or type of mobile device for the user. The credentials can also be associated with a plurality of mobile devices. Otherwise, vehicle sensor(s) or other devices can be used to detect a mobile device or mobile device type. In some embodiments, mobile device identification and location information can be crowd sourced from other external devices and provided to the infotainment system so that it can anticipate communicating with a mobile device.

In some embodiments, the identifier can be a MAC address, model number, or other information of a device. In other embodiments, the identifier is further abstracted from the identification information. For example, the identifier can indicate a model of a mobile device whereas the identification can indicate a MAC address of a specific mobile device. The MAC address can be associated with the identifier for the model number including the specific mobile device. In some embodiments, a model number or other identification can be determined that is associated with an identifier. The identifier can be located via a lookup table, a function, or other means.

At 708, a communication mode can be selected from the communication mode(s) associated with the identifier. This selection can be made by following a pointer associated with the identifier via a linked list, via a lookup table, or other technique. Memory organization of the profile(s) can also be used to locate the communication mode(s). For example, memory addresses can be reserved for identifiers. Memory addresses can also be reserved for communication mode(s). The memory addresses can be related via a known offset from the memory addresses for the identifiers, for example.

The communication mode(s) associated with the identifier(s) can be populated in a variety of means. In certain embodiments, the identifiers, associations, and/or communication mode(s) are provided by an external database. In certain embodiments, the identifier(s), association(s), and/or communication mode(s) can be populated by an infotainment system as the identifier(s), association(s), and/or communication mode(s) are detected by the infotainment system. They can thus be updated over time to account for changing preferences or device capabilities. In certain embodiments, the communication mode(s) can be weighted or scored. The weighting can be provided by the external database or can be learned by an infotainment system using adaptive or other techniques. For example, a weighting for a cumulative time that a certain communication mode is utilized can be assigned to the communication mode. As another example, the weighting can indicate a number of times that the communication mode has been used. Various other information can be associated with each of the communication modes that may or may not affect the weighting. For example, a time of day, power requirements for certain communication modes, a range of a communication mode, bandwidth available using a communication mode, a location of the user or of the vehicle, preferences input by a user, or other information can be used to affect the weighting or selection of a communication mode.

Various rules of the infotainment system can be used for selection of the identifier, associated communication mode(s) or other. For example, a rule can indicate that upon power up of an infotainment system, the system will search for mobile devices that can be communicated with. This search can be accomplished by cycling through various communication modes in a specified order. After mobile device(s) are identified, rules can be followed to determine identifier(s) associated with the mobile device(s) located and allocation of communication mode(s). In certain embodiments, the rules can determine selection of communication mode(s) depending on characteristics of data transferred between a mobile device and an infotainment system. For example, a rule can indicate that if a data rate for a certain communication mode has been exceeded, a different communication mode can be selected. Otherwise, the rule can dictate that the infotainment system provide a message to the mobile device indicating that the mobile device should be tethered to an access port via a wired connection. When the data rate returns to a lower rate, a different communication mode (or the original communication mode) can be selected.

In certain embodiments, rules can indicate that, as a vehicle enters a certain geographic area or certain interfering signals are detected, a different communication mode is to be selected. In embodiments, rules can be used to detect that sensitive information may be transferred through a communication mode and a second communication mode may be more desirable because it may be more secure. In certain embodiments, rules can include updating of weighting/score information in order to implement machine learning to affect future selection of communication mode(s).

Machine learning can be implemented via a variety of techniques. As one example, regression analysis can be used to iteratively determine a predictive model. The iteration can be used to improve variables or techniques associated with modeling by successive analyses. For example, a predictive model can be refined by comparing predicted values with recorded values. The recorded values can be gathered in real time or historic values. Instance based techniques is another example model for implementation of machine learning. Instance based techniques can use a database of example data values and compare new data values to the database using a similarity measure to make a best match and/or prediction of future values. Instance based techniques can utilize one or more databases for storage of historic values for use in determination of predictive future values based on real time values.

Decision tree techniques are another example for implementation of machine learning. Decision tree techniques can use a model of decisions previously made based on historic values and/or attributes of data. Bayesian techniques are another example that can implement machine logic using probability inference. Probability inferences can use knowledge of prior, historic data values or events to predict future data values or events. Clustering techniques are another example. Clustering techniques can organize data values and determine one or more inherent structures to organize data values into groups of commonality. Another example technique can use neural networks. Neural networks are models inspired by structures and/or functions of biological neural networks. Neural networks can contain one or more nodes that can be trained using historic values to obtain an optimal path for traversal of nodes/decision making for future values. The preceding example techniques are non-limiting and can be used in any combination. For example, ensemble techniques can be used to poll one or more machine learning techniques to decide a future value.

At 710, a communication link between the mobile device and transceiver unit can be established using the mode selected at 708. The communication link can be used in conjunction or in place of an existing communication link. Alternatively, the communication link can initiate communication between the transceiver unit and the mobile device.

FIG. 8 shows an example data table 800 that can be used to store identifier(s), communication mode(s), and optionally score(s). Identifiers in example data table are given as 0001 and 0002. However, it should be understood that these identifiers can be provided in any number of formats and/or increments. The identifiers can also be arranged in any order. Data table 800 is an example logical representation of a memory construct that can store like information. Column "Communication mode(s)" includes various example communication modes that can be associated with each recorded identifier. For example, identifier 0001 is associated with communication modes Bluetooth®, Wi-Fi®, and USB®. Identifier 0002 is shown to be associated with communication modes cellular and NFC. Furthermore, optional scores are provided via a column. These scores can be used to enable machine learning for selection of appropriate communication mode(s) for a given identifier or for selection of an appropriate identifier. For example, a mobile device may be associated with an identifier for a type of device as well as to uniquely identify the device. In certain embodiments, the scores can be altered from time to time using information from communication links between a mobile device and an infotainment system.

In certain embodiments, features of the disclosure can be implemented as middleware between an existing infotainment system or infotainment software suite and mobile device(s). For example, the selection of a communication mode from communication mode(s) associated with an identifier can be added to existing infotainment system functionality. In certain embodiments, this functionality can be added without modification of the infotainment system. For example, a device can be added to an infotainment system including a transceiver unit that can supplement existing communication modes available to the infotainment system.

Throughout this disclosure, the use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. A method for utilizing an input device in conjunction with a vehicle infotainment system, comprising:
   detecting, by the vehicle infotainment system, presence of the input device;
   in response to detecting the presence of the input device, selecting, based on an identity of a user associated with the input device or a detected location associated with the input device, a display device from a plurality of display devices of the vehicle infotainment system;
   pairing the input device with the selected display device of the vehicle infotainment system;
   determining whether an identifier of a plurality of identifiers is associated with the input device:
   selecting, based on a rule, at least one mode of a plurality of modes associated with the identifier;
   setting the selected mode as the communication mode whereby the input device communicates with the vehicle infotainment system; and
   directing input events received from the input device via the communication mode to one or more processes executing in the infotainment system corresponding to the selected display device.

2. The method of claim 1, wherein each mode of the at least one mode is associated with a weighing factor; and
   the selecting the mode of the at least one mode associated with the identifier is based on the weighing factor of each mode of the at least one mode.

3. The method of claim 2 wherein the weighing factor for each mode of the at least one mode is determined based on a number of times or an amount of time that each mode of the at least one mode has been used to communicate with the input device.

4. The method of claim 1, wherein the selecting of the display device is based on the identity of the user associated with the input device, and the selecting comprises:
   recognizing the user associated with the input device as a registered user of the vehicle infotainment system;
   determining a seat location of the registered user of the vehicle infotainment system; and
   selecting the display device based on the determined seat location of the registered user.

5. The method of claim 4, wherein the seat location of the registered user is determined based on a last known location from where the registered user performed a login to the vehicle infotainment system.

6. The method of claim 4, wherein the seat location of the registered user is determined based on a location where the registered user is detected based on biometric information.

7. The method of claim 1, wherein the selecting of the display device is based on the detected location associated with the input device, and the selecting comprises:
   determining a location of a port of the vehicle infotainment system making a wired connection with the input device; and selecting the display device based on physical proximity of the display device to the determined location of the port.

8. The method of claim 1, wherein the selecting of the display device is based on the detected location associated with the input device, and the selecting comprises:
   estimating the location of the input device based on wireless ranging signals;
   selecting the display device based on the estimated location of the input device.

9. The method of claim 1, wherein the detecting of the presence of the input device comprises detecting a wired or wireless connection made between the input device and a port of the vehicle infotainment system.

10. The method of claim 9, wherein the wired or wireless connection is a USB connection.

11. The method of claim 9, wherein the wired or wireless connection is a Bluetooth connection.

12. The method of claim 1, wherein the detecting of the presence of the input device comprises detecting a device ID associated with the input device.

13. The method of claim 1, wherein the input device is a smart phone.

14. A vehicle infotainment system comprising:
    a plurality of display devices;
    a transceiver unit configured to communicate with the plurality of display devices and a first input device via any one of a plurality of modes;
    a processing unit communicatively coupled to the transceiver unit and configured to:
    detect the presence of the first input device;
    detect whether the first input device communicates with the transceiver unit via a first mode of the plurality of modes;
    determine whether a second mode of the plurality of modes is supported by the first input device, including determining whether the first input device has previously been communicated with the vehicle infotainment system via the second mode;

determine, based on a determination by the vehicle infotainment system that the second mode is preferred over the first mode, whether to select the second mode for communication with the first input device; and send a message, via the transceiver unit, to the first input device identifying the second mode;

selecting, based on an identity of a user associated with the first input device, a display device from the plurality of display devices of the vehicle infotainment system;

pairing the first input device with the selected display device, wherein as a result of the pairing, input events received from the first input device are directed, via the second mode, to one or more processes corresponding to the selected display device.

15. The vehicle infotainment system of claim 14, wherein the selecting of the display device is based on the identity of a user associated with the first input device, and the selecting comprises:

recognizing the user associated with the first input device as a registered user of the vehicle infotainment system;

determining a seat location of the registered user of the vehicle infotainment system; and selecting the display device based on the determined seat location of the registered user.

16. The vehicle infotainment system of claim 15 wherein the first input device is a smart phone.

17. A system for utilizing an input device in conjunction with a vehicle infotainment system, comprising:

means for detecting, by the vehicle infotainment system, presence of the input device;

means for, in response to detecting the presence of the input device, selecting, based on an identity of a user associated with the input device or a detected location associated with the input device, a display device from a plurality of display devices of the vehicle infotainment system;

means for determining whether an identifier of a plurality of identifiers is associated with the input device;

means for selecting, based on a rule, at least one mode of a plurality of modes associated with the identifier;

means for setting the selected mode as the communication mode whereby the input device communicates with the vehicle infotainment system; and means for pairing the input device with the selected display device of the vehicle infotainment system, wherein as result of the pairing, input events received from the input device are directed by the vehicle infotainment system to one or more processes executing in the infotainment system corresponding to the selected display device.

* * * * *